United States Patent [19]
Wind et al.

[11] Patent Number: 5,998,881
[45] Date of Patent: Dec. 7, 1999

[54] APPARATUS AND METHOD FOR CONTROLLING LOW ENGINE IDLE RPM WITHOUT DISCHARGING A VEHICLE BATTERY BY MONITORING THE VEHICLE ALTERNATOR FIELD MODULATION

[75] Inventors: Robert C. Wind, Canton; Daniel W. Sullivan, Detroit; John G. Hatfield, Leonard, all of Mich.

[73] Assignee: Chrysler Corporation, Auburn Hills, Mich.

[21] Appl. No.: 09/069,270

[22] Filed: Apr. 29, 1998

[51] Int. Cl.⁶ .............................. F02D 41/08; H02P 9/04
[52] U.S. Cl. ................... 290/40 A; 123/339.1; 290/40 C
[58] Field of Search ................... 290/40 R, 40 A, 290/40 F, 40 C; 322/28, 27; 123/339.1, 339.14

[56] References Cited

U.S. PATENT DOCUMENTS

| | | | |
|---|---|---|---|
| 4,143,280 | 3/1979 | Kuehn, Jr. et al. | 290/9 |
| 4,459,489 | 7/1984 | Kirk et al. | 290/13 |
| 4,510,903 | 4/1985 | Sakakiyama | 123/339 |
| 4,553,516 | 11/1985 | Hasegawa | 123/339 |
| 4,611,560 | 9/1986 | Miyazaki et al. | 123/339 |
| 4,629,968 | 12/1986 | Butts et al. | 322/29 |
| 4,633,093 | 12/1986 | Otobe et al. | 290/40 R |
| 4,640,244 | 2/1987 | Koike et al. | 123/339 |
| 4,659,977 | 4/1987 | Kissel et al. | 320/64 |
| 4,682,044 | 7/1987 | Hotate et al. | 290/40 B |
| 4,794,898 | 1/1989 | Kato | 123/339 |
| 5,001,412 | 3/1991 | Carter et al. | 322/10 |
| 5,057,764 | 10/1991 | Fujimoto et al. | 322/14 |
| 5,097,140 | 3/1992 | Crall | 290/36 R |
| 5,140,960 | 8/1992 | Fujimoto et al. | 123/339 |
| 5,151,647 | 9/1992 | Frantz | 322/99 |
| 5,263,447 | 11/1993 | Fujimoto | 123/339 |
| 5,270,575 | 12/1993 | Togai et al. | 290/40 C |
| 5,293,076 | 3/1994 | Fukui | 290/406 |
| 5,323,101 | 6/1994 | Pierret et al. | 322/28 |
| 5,352,971 | 10/1994 | Nishimura | 322/27 |
| 5,467,008 | 11/1995 | Uchinami | 322/27 |
| 5,481,176 | 1/1996 | DeBiasi et al. | 322/7 |

FOREIGN PATENT DOCUMENTS

| | | |
|---|---|---|
| 155 748 | 9/1985 | European Pat. Off. . |
| 59-158357 | 9/1984 | Japan . |
| 62-70635 | 4/1987 | Japan . |
| 62-93452 | 4/1987 | Japan . |
| 1-277650 | 11/1989 | Japan . |
| 2 135 797 | 9/1984 | United Kingdom . |
| 2 248 700 | 4/1992 | United Kingdom . |

*Primary Examiner*—Nick Ponomarenko
*Attorney, Agent, or Firm*—Mark P. Calcaterra

[57] ABSTRACT

An apparatus and method for controlling low engine idle RPM without discharging a vehicle battery by monitoring the vehicle alternator field modulation. The apparatus includes an engine control module, an alternator, electrical loads and a switch module. The engine control module includes a first input and a first output forming a portion of a first feedback loop. The first input and first output enable the engine control module to sense and control the idle RPM of the engine. The alternator includes an armature and a field coil where rotation of the armature and modulation of the field coil controls the amount of current supplied by the alternator. The switch module modulates the field coil upon receipt of a drive signal from the engine control module. The switch module forms a part of the engine control module such that the engine control module can adjust the idle RPM of the engine to a minimum idle RPM necessary to supply current to the electrical loads by determining the idle RPM of the vehicle with the first feedback loop and by automatically knowing the field coil modulation of the field coil by generating the drive signal.

20 Claims, 4 Drawing Sheets

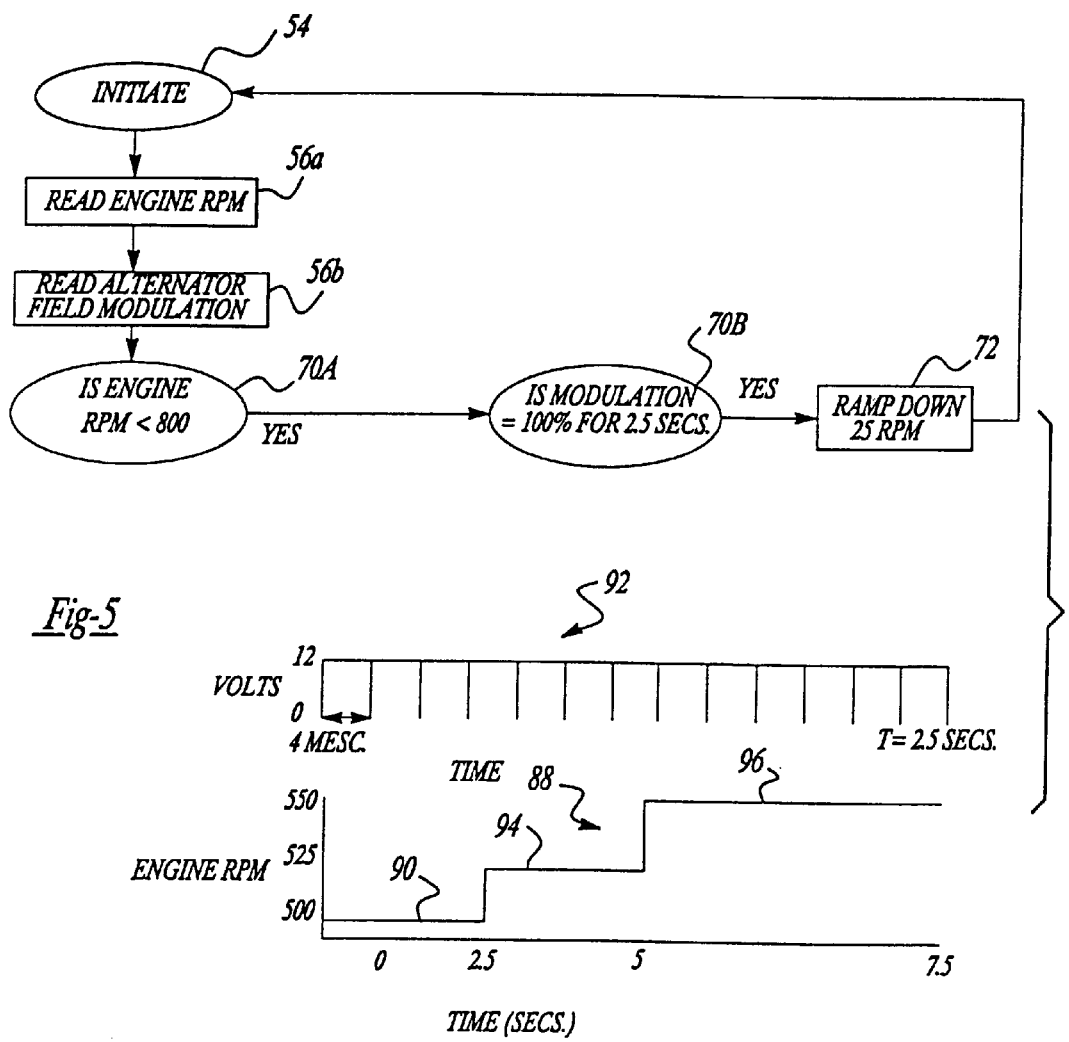

APPARATUS AND METHOD FOR CONTROLLING LOW ENGINE IDLE RPM WITHOUT DISCHARGING A VEHICLE BATTERY BY MONITORING THE VEHICLE ALTERNATOR FIELD MODULATION

BACKGROUND OF THE INVENTION

1. Field of the Invention

This invention relates generally to a charging system for automotive vehicles and, more particularly, to an apparatus and method for controlling low engine idle RPM without discharging a vehicle battery by continuously monitoring the vehicle alternator field modulation.

2. Discussion of the Related Art

In conventional vehicle charging systems, an to alternator, driven by an internal combustion engine, converts mechanical power into electrical power. This power is then used to charge the vehicle battery and drive various electrical systems or loads in the vehicle. As the speed or revolutions per minute (RPM) of the engine varies, the rotation speed of the armature in the alternator also varies, thereby changing the amount of current supplied by the alternator. Thus, with a high rotation speed, higher current can be supplied by the alternator and conversely with a lower rotation speed, lower current is generally supplied by the alternator. The modulation of the field coil in the alternator also varies the amount of current supplied by the alternator. In this way, with a higher modulation or duty cycle, the field coil is energized for a longer period of time, thereby providing a greater current supply compared to when the field coil is only energized for shorter periods of time.

To aid in improving vehicle fuel economy and reduce vehicle emissions, it is generally desirable to maintain the engine idle RPM as low as possible. Unfortunately, low idle speeds may not turn the alternator at a sufficient speed to provide an adequate current supply when the vehicle is heavily loaded electrically. To ensure that the vehicle battery does not become discharged during such low engine idle speeds, the voltage at the battery is generally monitored to ensure that the voltage does not drop below a predetermined value. If the voltage does drop below the predetermined value, the modulation to the field coil of the alternator is increased or the engine idle RPM is increased so that the alternator can supply more current to the battery to maintain the predetermined voltage. By monitoring the voltage at the battery and controlling either the engine RPM and/or the field coil modulation, discharge of the vehicle battery can generally be prevented.

However, such voltage monitoring systems have several disadvantages. For example, it is generally difficult to accurately monitor the battery voltage since the battery can generally be considered and modeled as a capacitor. Because of this, there is a delay in the voltage drop during actual discharge of the battery and, therefore, battery discharge may occur before it is accurately detected. In other words, an accurate corresponding voltage change does not occur because of the capacitance effect in the battery. Moreover, the battery voltage will generally vary significantly based on temperature and other conditions which makes monitoring such a reference even more difficult. This may result in the engine RPM being cycled high and low (in its attempt to maintain voltage) intermittently, which is an undesirable condition. Such a system also exhibits the inability to vary the engine RPM at the absolute minimum necessary to maintain the battery in a charge condition, thereby further increasing fuel consumption and vehicle emissions.

Several systems have tried to improve upon the above-identified deficiencies such as U.S. Pat. No. 4,794,898 to Kato. However, this system also exhibits several disadvantages. Specifically, Kato indicates that it detects both the conduction rate of a switching circuit which controls field current, as well as engine speed to determine the optimal engine idle speed. However, Kato actually averages a specifically monitored voltage output utilizing a separate smoothing circuit and utilizes this average voltage as a representation of the conduction rate. This significantly reduces the response time in such a system. In addition, Kato must utilize a look-up table generated from empirical data to compare the average voltage with a predetermined desired voltage at the detected RPM. If the average voltage does not match the desired voltage, the rotation speed of the engine is adjusted accordingly. This provides for a very labor-intensive and complex device which requires the gathering of empirical data for each engine to generate the look-up table, thereby making such a system extremely complex to implement and not very practical.

What is needed then is an apparatus and method for controlling low engine idle RPM without discharging a vehicle battery by monitoring the vehicle alternator field modulation. This, in turn, will improve vehicle fuel economy; reduce vehicle emissions; accurately and responsively determine battery discharge conditions; provide real time control and response based on internally or automatically knowing the modulation of the alternator field coil; reduce high/low cycling of engine RPM; and enable the engine to operate at the absolute minimum RPM necessary without battery discharge occurring. It is, therefore, the object of the present invention to provide such an apparatus and method for controlling low engine idle RPM without discharging a vehicle battery by monitoring the vehicle alternator field modulation.

SUMMARY OF THE INVENTION

In accordance with the teachings of the present invention, an apparatus and method for controlling low engine idle RPM without discharging a vehicle battery by continuously monitoring the vehicle alternator field modulation is disclosed. The apparatus and method enables the engine idle RPM to be set to the absolute minimum necessary without discharging the vehicle battery to provide improved fuel economy and reduced emissions. This is achieved by utilizing a control module which internally knows the alternator field modulation by generating a drive signal to drive a field coil of the alternator.

In one preferred embodiment, an apparatus for controlling idle RPM of an engine without discharging a vehicle battery includes an engine control module, an alternator, a plurality of electrical loads and a switch module. The engine control module includes a first input and a first output forming a portion of a first feedback is loop. The first input and the first output enable the engine control module to sense and control the idle RPM of the engine. The alternator includes an armature and a field coil whereby rotation of the armature and modulation of the field coil controls the amount of current supplied by the alternator. The plurality of electrical loads receive the current supplied by the alternator and/or battery. The switch module modulates the field coil of the alternator upon receipt of a drive signal generated from the engine control module. The switch module forms a part of the engine control module such that the engine control module adjusts the idle RPM of the engine to a minimum idle RPM necessary to supply sufficient current to the electrical loads without discharging the vehicle battery by determining the idle RPM of the vehicle with the first feedback loop and by automatically knowing the field coil modulation by internally generating the drive signal.

Use of the present invention provides an apparatus and method for controlling low engine idle RPM without discharging a vehicle battery by monitoring the vehicle alternator field modulation. As a result, the aforementioned disadvantages associated with the currently available systems for controlling engine idle RPM have been substantially reduced or eliminated.

BRIEF DESCRIPTION OF THE DRAWINGS

Still other advantages of the present invention will become apparent to those skilled in the art after reading the following specification and by reference to the drawings in which:

FIG. 5 is a flow diagram for a third condition of the preferred embodiment of the present invention along with an alternator field modulation signal and an engine RPM signal.

DETAILED DESCRIPTION OF THE PREFERRED EMBODIMENT

The following description of the preferred embodiment concerning an apparatus and method for controlling low engine idle RPM without discharging a vehicle battery by monitoring the vehicle alternator field modulation is merely exemplary in nature and is not intended to limit the invention or its application or uses. Moreover, while the present invention is described in detail below with reference to specific parameter values for RPM, modulation, time and increment values, it will be appreciated by those skilled in the art that the present invention is clearly not limited to such specific parameter values and may be employed with various other parameter values.

Figure 1:
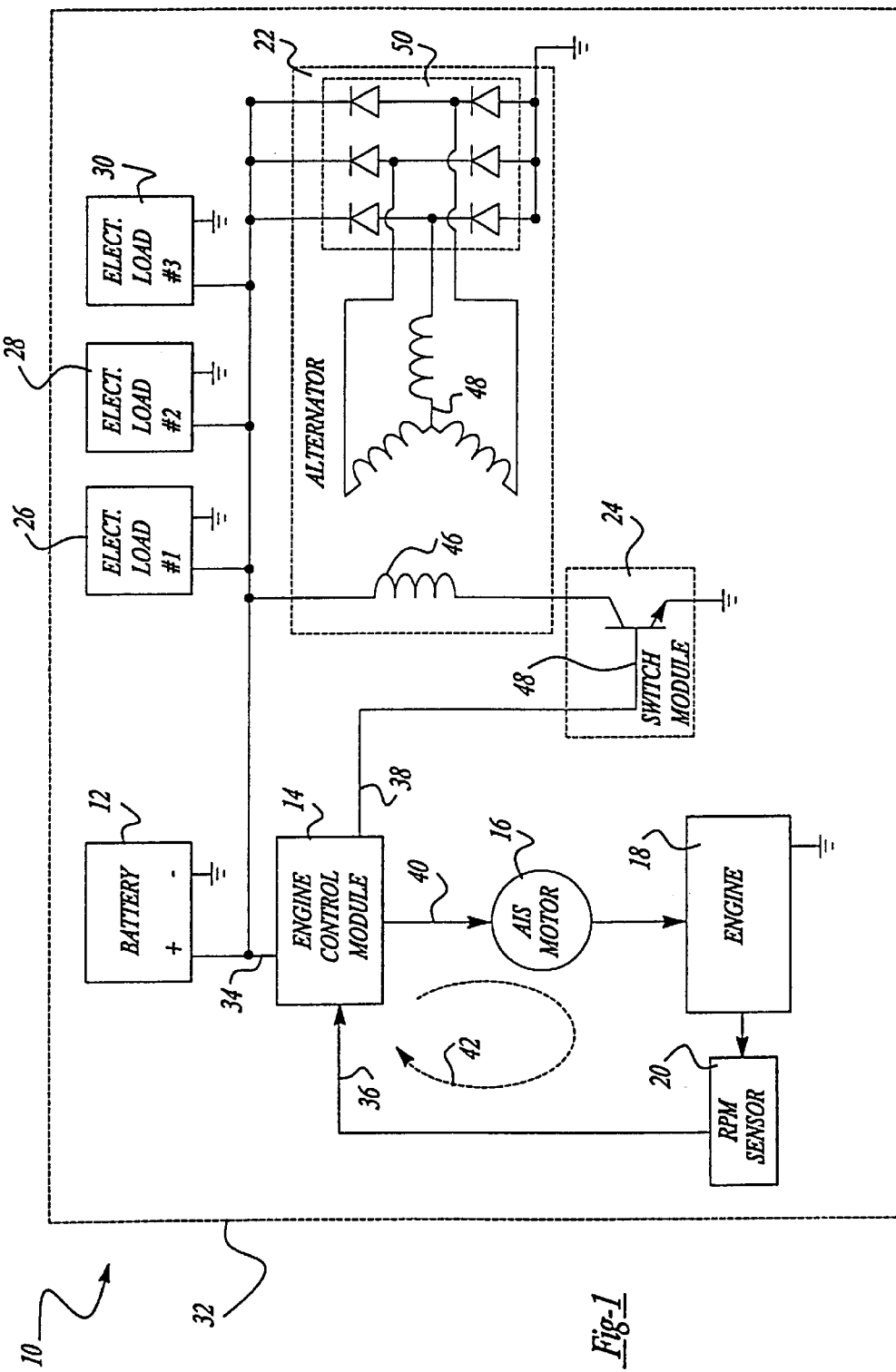
FIG. 1 is an schematic block diagram of a preferred embodiment of the present invention.

Referring to FIG. 1, a schematic block diagram of the preferred embodiment of an apparatus 10 for controlling low engine idle RPM by continuously monitoring the vehicle alternator field modulation is shown. The apparatus 10 includes a vehicle battery 12, an engine control module 14, an automatic idle speed (AIS) motor 16, an internal combustion engine 18, an RPM sensor 20, an alternator 22, a switch or drive module 24 (incorporated within the engine control module 14), and various electric loads 26, 28, and 30, all located within a vehicle 32. The electrical loads 26, 28 and 30 represent various electrical loads throughout the vehicle 32 such as the head lamps, radio, air conditioning, rear defrost, blower motors, etc.

The engine control module 14 preferably includes a suitable programmable microprocessor. The engine control module 14 monitors various parameters throughout the vehicle 32 including the voltage of battery 12, via input 34, and the revolutions per minute (RPM) of the engine 18, via input 36, and the RPM sensor 20. The engine control module 14 also controls various outputs including the modulation or duty cycle of the switch module 24, via output 38, as well as the idle RPM of engine 18, via output 40, and the AIS motor 16.

The engine control module 14 controls the engine idle RPM of internal combustion engine 18, via a closed loop feedback 42, comprising the AIS motor 16, engine 18 and RPM sensor 20. Specifically, the RPM of the engine 18 is monitored by way of the RPM sensor 20, which is preferably a hall effect sensor that monitors the rotation speed at the crankshaft of the engine 18. The hall effect or RPM sensor 20 provides a digital RPM signal, via output 36, which is monitored by the engine control module 14 to assess and determine the engine RPM. To vary the engine RPM, the engine control module 14 applies an idle control signal, via output 40, to the automatic idle speed (AIS) motor 16. The AIS motor 16 is preferably a stepper motor which is actuated in response to the idle control signal, via output 40, to cause the stepper motor 16 to be controllably moved. The rotation of the stepper motor 16 is coupled to a conventional throttle control mechanism of the engine 18 to vary the engine idle RPM which is again subsequently monitored, via the RPM sensor 20, within the feedback loop 42. This allows the engine control module 14 to both monitor and control the engine idle RPM on a real time basis.

The engine control module 14 also controls the current supply from the alternator 22, via the switch module 24 and a field coil 46 in the alternator 22. Specifically, the engine control module 14 controls the modulation or duty cycle of the field coil 46 by controlling the actuation of the switch module 24, via a drive signal from the output 38 based upon the battery voltage received at input 34. The switch module 24 is preferably a power transistor 48 consisting of Darlington pair bipolar junction transistors, a field effect transistor (FET) or other appropriate power transistor 48. The switch module 24 is incorporated into and forms a part of the engine control module 14 such that the microprocessor in the engine control module 14 drives the transistor 48, via the drive signal applied to the output 38. By generating the drive signal which drives the switch module 24, the engine control module 14 internally knows or automatically knows what the field coil modulation is without having to provide a separate monitoring device. This significantly increases the responsiveness of the apparatus 10 since the field coil modulation is a continuously known parameter, as well as reduces the overall cost of the apparatus 10.

The switch module 24 is preferably switched or modulated at four millisecond (4 ms) intervals so that the field coil 46 also conducts in four millisecond intervals. In other words, the engine control module 14 modulates or drives the switch module 24 at various four millisecond intervals depending on the voltage sensed at input 34. For example, the drive signal at output 38 may be high for a four millisecond pulse, followed by three low four millisecond pulses (i.e. twelve milliseconds), followed by another high four millisecond pulse with three low four millisecond pulses. This essentially provides a period of sixteen milliseconds and a duty cycle of approximately 25%. Alternatively, the drive signal from output 38 may be a series of all high four millisecond pulses which are stringed together to provide a 100% duty cycle or modulation of the field coil 46. Still further, the modulation may be any combination of four millisecond high/low pulses. As the modulation or duty cycle is increased, the current supplied by the alternator 22 is increased. Moreover as the engine RPM is increased, the armature 48 of the alternator 22 is also rotated at a higher speed, thereby also increasing the current output capacity of the alternator 22.

The alternating current (AC) generated by the alternator 22 is rectified, via a series of diodes 50, to supply a current to the electrical loads 26, 28 and 30, as well as to charge the battery 12. In low idle RPM conditions, the alternator 22 may not be able to supply a sufficient current to the electrical loads 26, 28 and 30, even at 100% modulation of the field coil 46 due to the low rotation speed of the armature 48. This condition requires the battery 12 to supply some additional current to the electrical loads 26, 28 and 30, creating a discharge condition on the battery 12. At higher engine RPM conditions the armature 48 of the alternator 22 is generally rotated at a sufficient speed so that the alternator 22 can supply current to the electrical loads 26, 28 and 30 without discharging the battery 12. To ensure that there is minimal discharge of the battery 12 during the low idle RPM conditions, the engine control module 14 automatically and internally knows the modulation or duty cycle of the field coil 46 and simultaneously monitors the RPM of the engine 18 in a real time manner to ensure a sufficient engine RPM that minimizes any battery discharge.

Figure 2:
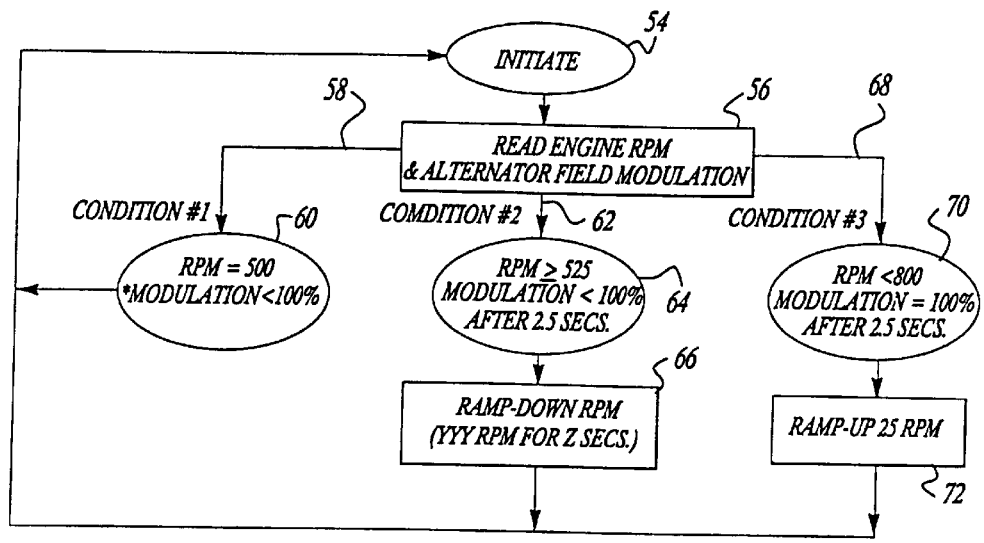
FIG. 2 is a flow diagram representing the overall operation of the preferred embodiment of the present invention.

Turning to FIG. 2, an overall RPM idle control flowchart is shown detailing the method or routine utilized by the engine control module 14 to provide an absolute minimum idle RPM at various electrical loads 26, 28 and 30. It should be noted that the specific values provided herein and initially set in the engine control module 14 for RPM, percent modulation, time and incremental RPM steps are for exemplary purposes only. The specific parameter values set in the engine control module 14 include a percent or field coil modulation limit (MMM%) of about 100%, a time interval or predetermined period (T) of about 2.5 seconds, a low or minimum idle RPM limit (LLL RPM) of about 500 RPM and a high or maximum idle RPM limit (HHH RPM) of about 800 RPM providing for a range between about 500 to about 800 RPM, which is incremented in steps by a predetermined RPM value of about 25 RPM and an intermediate idle RPM limit (III RPM) of about 525 RPM. The engine control module 14 will also initially set the engine idle RPM at the low RPM limit (i.e. 500 RPM) and vary the RPM from there. Alternatively, the engine control module 14 may initially set the engine idle RPM at the high RPM limit or somewhere in between.

The method or routine begins at initiate block 54 where the engine control module 14 receives an ignition power up upon turning the ignition key of the vehicle 32. Initiate block 54 also sets and clears a latch in the engine control module 14 or microprocessor, further discussed herein and performs an internal system check. After the initiate block 54 is completed, the routine steps to monitoring block 56 where the engine control module 14 reads both the engine RPM, via the RPM signal from input 36 and the alternator field modulation by internally knowing the drive signal at output 38. Upon determining the engine RPM and alternator field modulation, the routine steps to one of three decision blocks depending on values of the engine RPM and alternator field modulation.

Following condition no. 1 along branch 58 leads to decision block 60. This path is taken if the engine RPM equals 500 RPM and the field modulation is less than 100%. Condition no. 1 is an equilibrium condition where the battery 12 is not being discharged since the modulation is less than 100% and, therefore, 500 RPM is adequate for the alternator 22 to fully supply current to the loads 26, 28 and 30. From decision block 60, the routine returns to initiate block 54.

Following condition no. 2 along branch 62 leads to decision block 64. This path is taken if the engine RPM is greater than or equal to an intermediate RPM limit of 525 RPM and the modulation is less than 100% for a period of 2.5 seconds. Condition no. 2 indicates that the engine RPM can be further reduced without discharging the battery 12 since the modulation is less than 100%. Therefore, the routine steps to action block 66, where the engine RPM is stepped down or kicked down by a predetermined value of 25 RPM and held at this new lower RPM for at least Z seconds. The RPM is maintained for Z seconds, which is preferably 2.5 seconds, to reduce any high/low cycling of the engine RPM during idle before returning to initiate block 54, thereby providing a smooth transition for the lowering of the vehicle idle RPM. Condition no. 2 is repeated until the vehicle reaches the low RPM limit (i.e. 500 RPM) and/or the modulation reaches the modulation limit (i.e. 100%) to sustain the regulated voltage and a non-discharge condition.

Following condition no. 3 along branch 68 leads to decision block 70. This path is taken if the engine RPM is less than 800 RPM and the modulation is 100% after a period of 2.5 seconds. Condition no. 3 indicates that the alternator 22 is supplying all the current it can at this RPM to power the electrical loads 26, 28 and 30 and therefore the battery 12 is probably being discharged. Since the battery 12 is probably being discharged, the routine steps to action block 72 to step up or kick up the RPM by a predetermined value of 25 RPM. Thereafter, the routine immediately returns to initiate block 54, without delay, since the system may be in a battery discharge condition. Condition no. 3 is repeated until the vehicle reaches the high RPM limit (i.e. 800 RPM) and/or the modulation drops below the modulation limit (i.e. 100%) to sustain the regulated voltage or a non-discharge condition.

The above method or routine further includes a latching step which latches a new low RPM limit (LLL RPM) once per key-on which is unlatched when the engine RPM is sustained at a predetermined RPM (PPP RPM) for a predetermined time (P seconds). For example, assume the vehicle 32 is initially started and left to idle for a short period of time, such that the engine RPM is subsequently stepped up from 500 RPM to 625 RPM under condition no. 3 of the above routine. Thereafter, assume the vehicle 32 is driven in traffic for only a short period of time such that the engine RPM is not sustained at the predetermined RPM (PPP RPM) for the predetermined time (P seconds). The low RPM limit (LLL RPM) will thus be changed or latched from 500 RPM to 625 RPM. In this way, when the vehicle 32 is again brought to an idle, the vehicle 32 will only be allowed to ramp down to 625 RPM. This reduces or eliminates hunting or high/low cycling of the engine RPM.

Assume the vehicle 32 is now driven on the highway so that the engine RPM is sustained at the predetermined RPM (PPP RPM) for the predetermined time (P seconds). With this condition met, the low RPM limit of 625 RPM is unlatched, thereby returning the low RPM limit back to 500 RPM. This permits the vehicle 32, at subsequent idle conditions, to be stepped down below 625 RPM to the 500 RPM limit.

Figure 3:
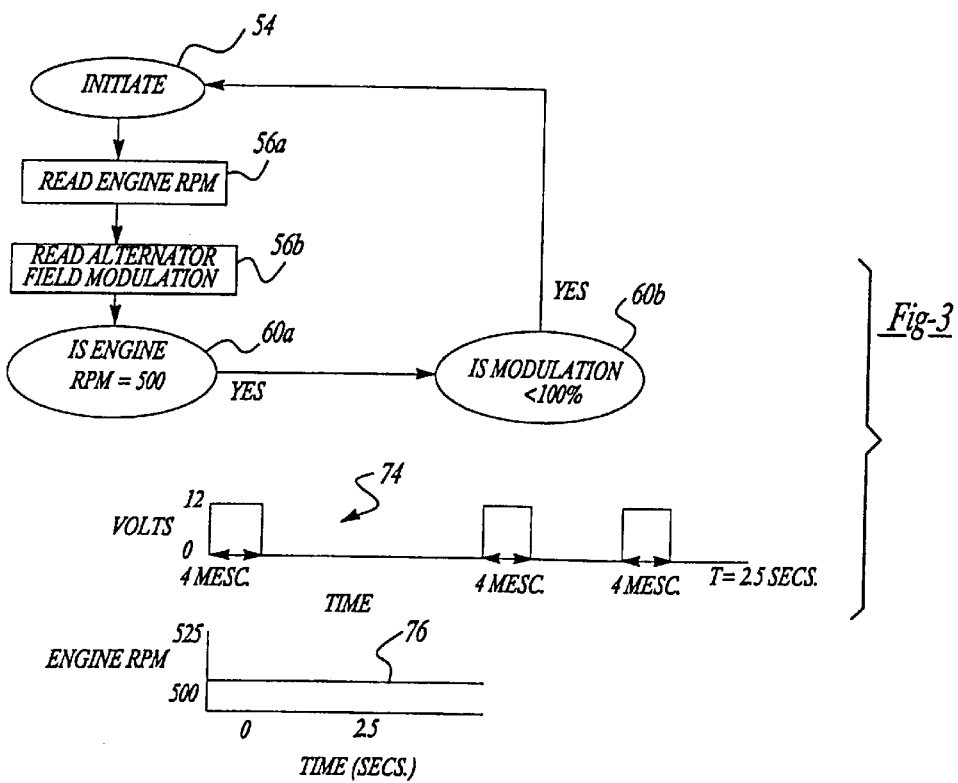
FIG. 3 is a flow diagram for a first condition of the preferred embodiment of the present invention along with an alternator field modulation signal and an engine RPM signal.
Figure 4:
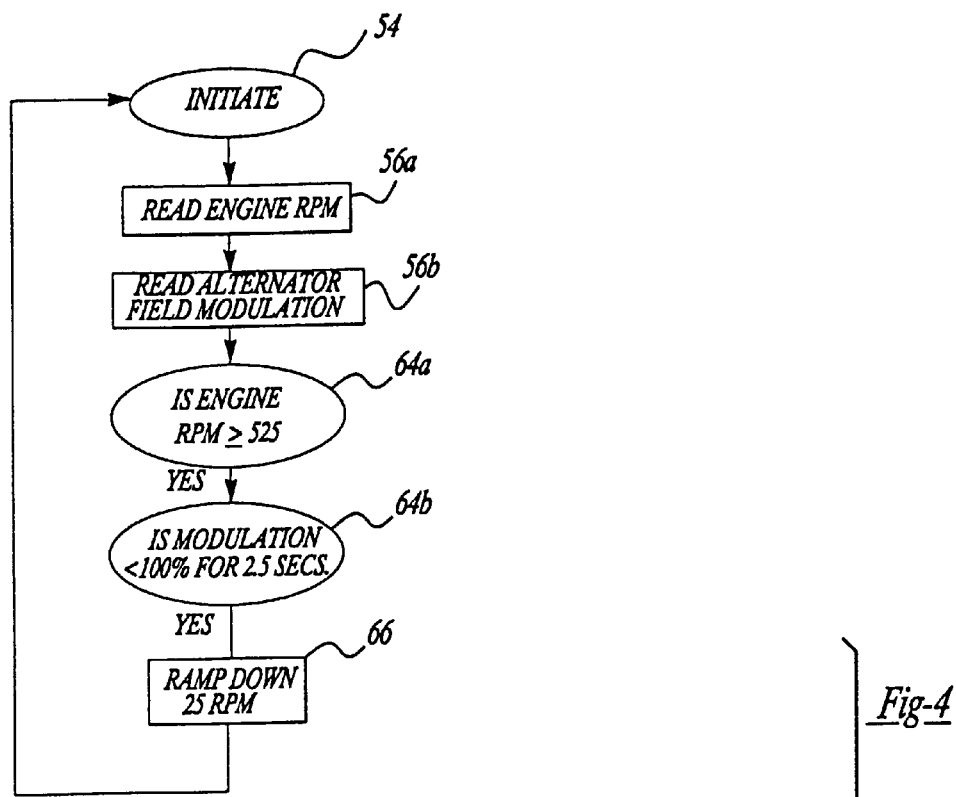
FIG. 4 is a flow diagram for a second condition of the preferred embodiment of the present invention along with an alternator field modulation signal and an engine RPM signal.
Figure 4:
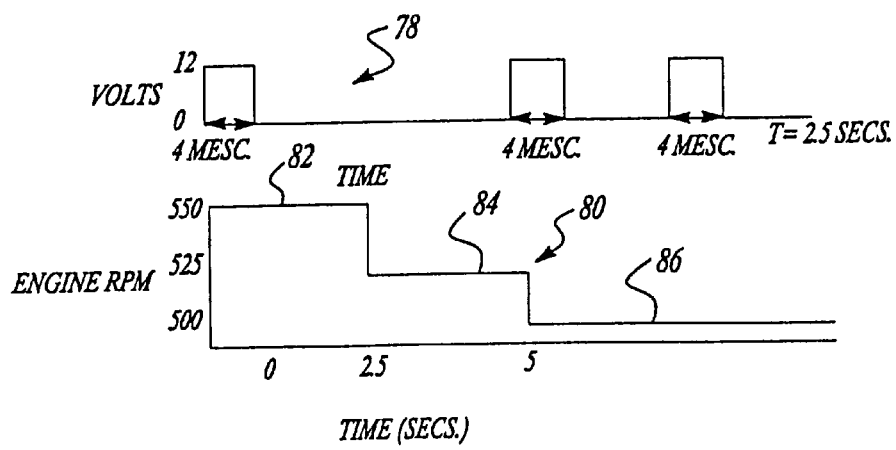

Turning to FIGS. 3–5, specific examples which show an alternator field modulation signal, as well as an RPM signal in connection with each condition is shown. Referring to FIG. 3, condition no. 1 of branch 58 is shown in detail along with a corresponding alternator field modulation signal 74 and an engine RPM signal 76. Specifically, the routine passes from initiate block 54 to monitor blocks 56A and 56B to read the engine RPM and the alternator field modulation. From there, the routine steps to decision blocks 60A and 60B to determine if the engine RPM is 500 RPM and if the modulation is less than 100%. Since the engine RPM signal 76 equals 500 RPM and the field modulation signal 74 is less than 100% (i.e. in equilibrium), the routine returns to initiate block 54. The engine RPM signal 76 is shown being monitored while the alternator field modulation signal 74 is shown as being less than 100% modulation.

Referring to FIG. 4, condition no. 2 of branch 62 is shown in detail for a step-down condition with a corresponding alternator field modulation signal 78 and a RPM signal 80 having steps 82, 84 and 86. Again, after the initiate block 54, the engine RPM is read at monitor block 56A and the alternator field modulation is read at monitor block 56B. From there the routine steps to decision block 64A to determine if the engine RPM is greater than or equal to 525 RPM and to decision block 64B, to determine if the modulation is less than 100% for 2.5 seconds. Since the engine RPM signal 80 is greater than 525 RPM and the field modulation signal 78 is less than 100% for 2.5 seconds, the routine steps to action block 66 to cause the RPM to be stepped down by 25 RPM. Referring to the engine RPM signal 80, the engine RPM is first shown at 550 RPM at reference numeral 84 with the field modulation signal 78 being less than 100% so that the engine RPM is reduced or stepped down to 525 RPM, designated by reference numeral 84. Upon going through the routine a subsequent time, if the engine RPM is again equal to or greater than 525 and the field modulation is less than 100%, the engine RPM is stepped down to 500 RPM, designated by reference numeral 86.

Conversely, at FIG. 5, condition no. 3 of branch 68 is shown in detail for a step-up condition where the engine RPM signal 88 is less than 800 RPM and the field modulation signal 92 equals 100% for 2.5 seconds. Here again, after the initiate block 54, the engine RPM is read at monitor block 56A and the alternator field modulation is read at monitor block 56B. At decision block 70A, it is determined if the engine RPM signal 88 is less than 800 RPM and at decision block 70B, it is determined if the modulation signal 92 equals 100% for 2.5 seconds. Since both conditions are met, the engine RPM is ramped or stepped up by 25 RPM at action block 72. Referring to the engine RPM signal 88, reference numeral 90 shows the engine RPM being about 510 RPM with the alternator field modulation signal 92 being at 100% modulation for a period of 2.5 seconds. The engine RPM is then stepped up to 535 RPM, as designated by reference numeral 94. Should the modulation continue to be 100%, as shown by modulation signal 88, the engine RPM will again be stepped up after 2.5 seconds to 560 RPM, designated by reference numeral 96. This step-up condition will continue until the field modulation is less than 100% or the maximum RPM limit (i.e. 800 RPM) is reached.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. An apparatus for controlling idle RPM of an engine without discharging a vehicle battery, said apparatus comprising:

an engine control module having a first input and a first output forming a portion of a first feedback loop, said first input and said first output operable to enable said engine control module to sense and control the idle RPM of the engine;

an alternator having an armature and a field coil, rotation of said armature and modulation of said field coil operable to control an amount of current supplied by said alternator;

a plurality of electrical loads operable to receive said current supplied by said alternator; and a switch module operable to modulate said field coil of said alternator upon receipt of a drive signal from said engine control module, said switch module forming a part of said engine control module, wherein said engine control module is operable to adjust the idle RPM of the engine to a minimum idle RPM necessary to supply said current to said electrical loads without discharging the vehicle battery by determining the idle RPM of the vehicle with said first feedback loop and by automatically knowing the field coil modulation of said field coil by generating said drive signal.

2. The apparatus as defined in claim 1, wherein said first feedback loop further includes an automatic idle speed (AIS) motor, the engine, and an RPM sensor, said AIS motor operable to receive an idle control signal from said first output and said engine control module operable to receive an RPM signal from said first input.

3. The apparatus as defined in claim 1, wherein said switch module includes a power transistor operable to be driven by said drive signal generated by said engine control module to modulate said field coil of said alternator.

4. The apparatus as defined in claim 1, wherein said engine control module is further operable to step-up said idle RPM by a first predetermined RPM value when said modulation of said field coil is 100% and said idle RPM is less than a high idle RPM limit.

5. The apparatus as defined in claim 4, wherein said engine control module is further operable to step-down said idle RPM by a second predetermined RPM value when said modulation of said field coil is less than 100% and said idle RPM is greater than or equal to an intermediate idle RPM limit.

6. The apparatus as defined in claim 5, wherein said engine control module is further operable to maintain said idle RPM when said modulation of said field coil is less than 100% and said idle RPM of said engine is equal to a low idle RPM limit.

7. The apparatus as defined in claim 6, wherein said engine control module is further operable to latch a new low idle RPM limit, whereby said engine control module is operable to step down said idle RPM to about said new low idle RPM limit.

8. The apparatus as defined in claim 1, wherein said plurality of electrical loads are selected from the group consisting of headlamps, radio, air conditioning, rear defrost and blower motor.

9. The apparatus as defined in claim 6, wherein said low idle RPM limit is 500 RPM, said intermediate idle RPM limit is 525 RPM, said high idle RPM limit is 800 RPM and said first and second predetermined RPM values are 25 RPM.

10. A method for controlling idle RPM of an engine without discharging a vehicle battery by monitoring field coil modulation of an alternator, said method comprising the steps of:

reading the idle RPM of the engine;

reading the field coil modulation of the field coil;

stepping-up the idle RPM by a first predetermined RPM value whenever the idle RPM is less than a high idle RPM limit and the field coil modulation is substantially equal to said field coil modulation limit; and stepping-down the idle RPM by a second predetermined RPM value whenever the idle RPM is greater than or equal to an intermediate idle RPM limit and said field coil modulation is less than said field coil modulation limit.

11. The method as defined in claim 10, wherein said step of stepping-up the idle RPM further includes stepping-up the idle RPM by said first predetermined RPM value whenever the idle RPM is less than said high idle RPM limit and the field coil modulation is substantially equal to said field coil modulation limit for a first predetermined time period.

12. The method as defined in claim 10, wherein the step of stepping-down the idle RPM further includes the step of stepping-down the idle RPM by said second predetermined RPM value whenever the idle RPM value is greater than or equal to said intermediate idle RPM and said field coil modulation is less than said field coil modulation limit for a first predetermined time period.

13. The method as defined in claim 12, wherein the step of stepping-down the idle RPM further includes maintaining the idle RPM for a second predetermined time period to reduce high/low cycling of the idle RPM.

14. The method as defined in claim 10, further comprising the steps of:

latching a second low idle RPM limit once per key-on; and unlatching said second low idle RPM limit when the engine RPM has been sustained for a predetermined RPM value for a predetermined time period.

15. The method as defined in claim 10, further comprising the step of maintaining the idle RPM of the engine whenever the idle RPM is equal to a low idle RPM limit and said field coil modulation is less than said field coil modulation limit.

16. A method for controlling idle RPM of an engine without discharging a vehicle battery by monitoring field coil modulation of an alternator, said method comprising the steps of:

setting a minimum idle RPM limit for the engine;

setting a maximum idle RPM limit for the engine;

setting an intermediate idle RPM limit for the engine;

setting a field coil modulation limit for a field coil of the alternator;

setting a first predetermined RPM value;

setting a second predetermined RPM value;

reading the engine RPM of the engine;

reading the field coil modulation of the field coil of the alternator;

maintaining the idle RPM of the engine whenever the idle RPM is equal to about said minimum idle RPM limit and the field coil modulation is less than said field coil modulation limit;

stepping-up the idle RPM by said first predetermined RPM value whenever the idle RPM is less than said maximum idle RPM limit and the field coil modulation is substantially equal to said field coil modulation limit; and stepping-down the idle RPM by said second predetermined RPM value whenever the idle RPM is greater than or equal to said intermediate idle RPM limit and said field coil modulation is less than said field coil modulation limit.

17. The method as defined in claim 16, wherein the step of stepping-up the idle RPM further includes the steps of continuing to step the idle RPM up by said first predetermined RPM value until the idle RPM substantially reaches said maximum RPM idle limit.

18. The method as defined in claim 16, wherein the step of stepping-down the idle RPM further includes the steps of continuing to step the idle RPM down by said second predetermined RPM value until the idle RPM substantially reaches said minimum RPM idle limit.

19. The method as defined in claim 16, further comprising the steps of:

latching a second minimum idle RPM limit once per key-on; and unlatching said second minimum idle RPM limit when the engine RPM has sustained a predetermined RPM value for a predetermined time period.

20. The method as defined in claim 16, wherein the step of reading the field coil modulation of the field coil of the alternator further includes generating a drive signal to modulate the field coil and automatically knowing the field coil modulation by generating said drive signal.

* * * * *